3,542,784
4-(HYDROXYANILINO)-2-(5-NITRO-2-FURYL)
QUINAZOLINES
Homer Albert Burch, Norwich, N.Y., assignor to The
Norwich Pharmacal Company, a corporation of Delaware
No Drawing. Filed Apr. 5, 1968, Ser. No. 719,272
Int. Cl. C07d 51/48
U.S. Cl. 260—256.4     4 Claims

ABSTRACT OF THE DISCLOSURE

Novel 4-(hydroxyanilino)-2-(5-nitro-2-furyl)quinazolines are provided which possess exceptional antibacterial potency against microorganisms, particularly those of importance in veterinary medicine and especially against those associated with bovine mastitis.

---

This invention is concerned with chemical compounds and aims to provide novel 4-(hydroxyanilino)-2-(5-nitro-2-furyl)quinazolines of the formula:

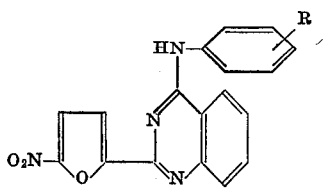

wherein R is hydroxy. These compounds possess a very high order of antibacterial activity particularly in respect to those organisms prevalent in the veterinary field.

It is known from U.S. Pat. No. 3,324,122 that certain 4-substituted-2-(5-nitro-2-furyl)quinazolines are antibacterial agents having a broad antibacterial spectrum and that the compounds of that patent having a 4-amino substituent also possess activity in suppressing in vivo lethal infections provoked by Staphylococcus aureus in animals.

Surprisingly the compounds of this invention do not possess such in vivo activity. They do, however, possess an unexpectedly greater in vitro antibacterial potency particularly toward those organisms such as Streptococcus agalactiae and Staphylococcus aureus, commonly occurring pathogens in bovine mastitis; Salmonella typhimurium and Escherichia coli, organisms of concern in calf enteritis; Pasturella multocida, a causative agent in fowl cholera; and Moraxella bovis, frequently associated with infectious keratoconjunctivitis in cattle.

The following table is representative of the antibacterial effect of the ortho-, meta-, and parahydroxyanilino-2-(5-nitro-2-furyl)quinazolines of this invention:

The amount of a compound of this invention to be incorporated in such compositions ranges from 0.1–1.0 percent by weight thereof, such concentration being sufficient to achieve the effect desired.

The compounds of this invention are rather readily prepared. The method which is currently preferred consists in reacting the appropriate hydroxyaniline with a 4-halo-2-(5-nitro-2-furyl)quinazoline in the presence of a solvent inert to the reactants and preferably under the influence of heat to hasten the reaction.

In order that this invention may be readily available to and understood by those skilled in the art the following examples of the preparation of the compounds thereof are appended.

EXAMPLE I 4-(o-hydroxyanilino)-2-(5-nitro-2-furyl)quinazoline

A 1 l., three-neck flask, fitted with a stirrer, was charged with 35 g. (0.127 mole) of 4-chloro-2-(5-nitro-2-furyl)quinazoline and 28.5 g. (0.26 mole) of o-hydroxyaniline in 500 ml. of dimethylformamide. The solution was heated on a steam bath for 2 hours. The solution was diluted with water until a solid began to separate. The mixture was cooled; the crude product was collected by filtration, and recrystallized from dilute aqueous dimethylformamide. The product separated as orange platelets melting at 275° dec. (corr.) in a yield of 35 g. (70.5%).

Analysis.—Calcd. for $C_{18}H_{12}N_4O_4$ (percent): C, 62.07; H, 3.47; N, 16.09. Found (percent): C, 61.89; H, 3.57; N, 15.90.

EXAMPLE II 4-(m-hydroxyanilino)-2-(5-nitro-2-furyl)quinazoline

A 1 l., three-neck flask, fitted with a stirrer, was charged with 35 g. (0.127 mole) of 4-chloro-2-(5-nitro-2-furyl)quinazoline and 28.5 g. (0.26 mole) of m-hydroxyaniline in 500 ml. of dimethylformamide. The solution was heated on a steam bath, with stirring, for 2 hours. The solution was diluted with water until a solid began to separate. The mixture was cooled; the crude product was collected by filtration, and recrystallized from dilute aqueous dimethylformamide. The product separated as yellow needles melting at 284° dec. (corr.) in a yield of 39 g. (88%).

Analysis.—Calcd. for $C_{18}H_{12}N_4O_4$ (percent): C, 62.07; H, 3.47; N, 16.09. Found (percent): C, 62.05; H, 3.54; N, 16.10.

EXAMPLE III 4-(p-hydroxyanilino)-2-(5-nitro-2-furyl)quinazoline

A solution of 30.2 g. (0.11 mole) of 4-chloro-2-(5-nitro-2-furyl)quinazoline and 27.2 g. (0.25 mole) of p-aminophenol in 500 ml. of dimethylformamide was heated on a steam bath for 2 hours. The solution was diluted with water until a dark solid had separated. The mixture was cooled. The solid was collected by filtration and recrystallized from dilute aqueous dimethylformamide. The

|  | Minimum inhibitory conc. in mcg./ml. | | | | | |
|---|---|---|---|---|---|---|
|  | S. agalactiae | S. aureus | S. typhimurium | E. coli | P. multocida | M. bovis |
| Compound: | | | | | | |
| ortho- | 1.0 | 0.03 | 0.5 | 0.5 | 1.0 |  |
| meta- | 0.06 | 0.03 | 1.0 | 1.0 | 0.06 | 0.003 |
| para- | 0.015 | 0.06 | 0.5 | 1.0 | 0.06 | 0.003 |

These compounds are adapted to be combined in various forms such as ointments, dusts, suspensions, gels, and the like using excipients which are common to the pharmaceutical art and thus providing compositions suitable for application to control and eradicate bacterial invaders.

product, melting at 286–288° dec. (corr.), was collected by filtration in a yield of 35 g. (91.5%).

Analysis.—Calcd. for $C_{18}H_{12}N_4O_4$ (percent): C, 62.07; H, 3.47; N, 16.09. Found (percent): C, 62.01; H, 3.58; N, 15.78.

What is claimed is:
1. A compound of the formula:

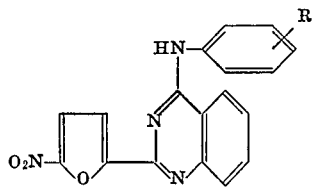

wherein R is hydroxy.

2. The compound 4-(o-hydroxyanilino)-2-(5-nitro-2-furyl)quinazoline.
3. The compound 4-(m-hydroxyanilino)-2-(5-nitro-2-furyl)quinazoline.
4. The compound 4-(p-hydroxyanilino)-2-(5-nitro-2-furyl)quinazoline.

References Cited
UNITED STATES PATENTS
3,238,208  3/1966  Gerns et al. -------- 260—256.4
3,324,122  6/1967  Burch ------------ 260—256.4

ALEX MAZEL, Primary Examiner
R. J. GALLAGHER, Assistant Examiner

U.S. Cl. X.R.
260—251; 424—251